United States Patent [19]

Prada et al.

[11] Patent Number: 5,229,347

[45] Date of Patent: Jul. 20, 1993

[54] CATALYST FOR MILD HYDROCRACKING OF CRACKED FEEDSTOCKS AND METHOD FOR ITS PREPARATION

[75] Inventors: Ricardo Prada, Caracas; Roberto Galiasso, San Antonio; Yilda Romero, La Victoria; Edito Reyes; Richard Munoz, both of Los Teques, all of Venezuela

[73] Assignee: Intevep, S.A., Venezuela

[21] Appl. No.: 697,118

[22] Filed: May 8, 1991

[51] Int. Cl.$^5$ .................... B01J 21/06; B01J 23/64; B01J 23/85; B01J 32/00
[52] U.S. Cl. .................... 502/221; 502/309; 502/439
[58] Field of Search .................... 502/221, 309, 439

[56] References Cited

U.S. PATENT DOCUMENTS

| | | | |
|---|---|---|---|
| 2,946,739 | 7/1960 | Gardner et al. | 502/309 |
| 3,016,346 | 1/1962 | O'Hara | 208/254 H |
| 3,099,618 | 7/1963 | Gardner et al. | 208/112 |
| 3,184,404 | 5/1965 | Flinn et al. | 208/112 |
| 3,830,752 | 8/1974 | Mickelson | 502/309 |
| 4,465,790 | 8/1984 | Quayle | 502/309 |
| 5,086,027 | 2/1992 | Singhal et al. | 502/166 |

Primary Examiner—W. J. Shine
Attorney, Agent, or Firm—Dressler, Goldsmith, Shore, Sutker & Milnamow, Ltd.

[57] ABSTRACT

A catalyst suitable for mild-hydrocracking of cracked petroleum hydrocarbon feedstocks and selective to diesel fuels contains a catalytically active metal phase constituted by a Group VI-B element, a Group VIII first transition series element and a Group VIII second transition series element, all supported on a titania-alumina support containing about 5% to about 30% by weight titania in the support. The support is prepared by combining titanium oxide and aluminum oxide hydrogels, in appropriate proportions, followed by extrusion, drying, and calcination. The catalytically active metal phase is introduced onto the support by impregnation followed by drying and calcination. The catalytically active metal phase is then sulfided. The produced catalyst is suitable for hydrodesulfurization, hydrodenitrogenation, mild-hydrocracking and aromatics hydrogenation of previously cracked petroleum hydrocarbon feedstocks.

29 Claims, 2 Drawing Sheets

CATALYST FOR MILD HYDROCRACKING OF CRACKED FEEDSTOCKS AND METHOD FOR ITS PREPARATION

TECHNICAL FIELD

This invention relates to catalysts for mild hydrocracking of cracked petroleum distillation fractions and residues.

BACKGROUND OF THE INVENTION

The catalytic mild-hydrocracking process is a petroleum refining operation which converts heavy distillation fractions or residues of cracked petroleum distillates into middle distillates.

In the first step of the reaction, the feedstock, which contains polycyclic aromatics, is solely hydrogenated, after which hydrocracking takes place together with further hydrogenation. In the mild-hydrocracking process that follows, the polycyclic aromatics are hydrocracked to monocyclic aromatics as well as to paraffins. During the mild hydrocracking process, organic nitrogen and sulfur compounds are converted into ammonia and hydrogen sulfide, respectively, to yield sweetened products.

In a typical mild hydrocracking process, the petroleum feedstock is brought into contact with a catalyst which has both a hydrogenation function and an acidic function. The hydrogenation function is provided by a combination of metals such as nickel-tungsten, nickel-molybdenum, cobalt-molybdenum, and the use of noble metals such as platinum, palladium, osmium, etc. The acidic function is provided by the catalytic support or substrate which consists, generally, of alumina modified by additives that improve the surface acidity of the catalyst, such as silicon, phosphorus, boron, fluorine, magnesium, titanium, zirconium, etc.

In order to obtain specific products, a considerable effort has been made to develop and commercialize highly active and selective catalysts for hydroconversion of residues into middle distillates and for the saturation of aromatic compounds contained in these residues.

For example, U.S. Pat. No. 3,016,346 to O'Hara describes a nickel-molybdenum catalyst supported on alumina and a smaller amount of titania (0.5 to 5.0 by weight %). The catalyst contains about 5% to about 10% by weight of molybdenum, about 0.1% to about 0.7% by weight cobalt and about 1% to about 5% by weight nickel, based on the weight of the finished catalyst. The catalyst has hydrodenitrogenation activity and also inhibits those hydrocracking reactions which result in excessive coke deposits on the catalysts when the catalyst is used for hydrotreating a thermally cracked middle fraction of naphtha in a standard relative activity test. The alumina-titania support in O'Hara is prepared by co-precipitation of aluminum and titanium hydroxides from a solution of titanium tetrachloride, an aqueous ammonium hydroxide solution and aluminum chloride and contains 3.7% by weight of titanium.

U.S. Pat. No. 4,465,790 to Quayle discloses a hydrodenitrogenation catalyst comprising catalytic molybdenum and nickel on a co-precipitated support of alumina and titania. The support is co-precipitated from solutions of the sulfates of aluminum and titanium. Titania in the support constitutes more than 5% by weight of the catalyst. The resulting hydrogel is processed using standard techniques to form a catalyst support. Catalytic metals are then impregnated onto the support. The molybdenum loading on the catalyst is between 10% and 25% by weight (as $MoO_3$) and the nickel loading is from 2% to 10% by weight (as $NiO$). However, this particular catalyst has relatively poor mechanical properties and is difficult to extrude during manufacture.

European Patent Application 0 199 399 discloses a method for making a hydrocarbon conversion catalyst with improved hydrodesulfurization and hydrodenitrogenation activity. The catalyst contains a Group VI-B metal that is either molybdenum or tungsten and a Group VIII metal that is either cobalt or nickel that are incorporated into a titania-containing alumina support. The catalyst is prepared by mulling together alpha aluminum monohydrate and titanium dioxide at a molar ratio of $Al_2O_3:TiO_2$ ranging from 3:1 to 15:1, acetic acid in a concentration ranging from 2.5 to 3.5 parts of acid per 100 parts of $Al_2O_3$ by weight, and sufficient water to produce an extrudable mixture. The mixture is then extruded and calcined. The metals are impregnated onto the support by conventional methods.

SUMMARY OF THE INVENTION

The trimetallic catalysts disclosed herein are useful for mild-hydrocracking of petroleum distillation fractions and residues. These catalysts are selective for the mild hydrocracking of cracked feedstocks or vacuum gas oil into diesel oils. In use, the present catalysts effectively convert aromatic compounds into saturated compounds. Also, the catalysts disclosed herein have good hydrodenitrogenation activity, good hydrodesulfurization activity, and are resistant to deactivation by coke or other carbon impurities in the petroleum distillation fractions and residues processed by the catalyst. As a result, the present catalyst usually has a useful life of about 24 months or more.

The catalyst of the present invention has a support of titania and alumina wherein the titania is present in an amount of about 5% to about 15%, preferably about 6% to about 10%, by weight based upon the weight of the support. The support has a pore volume of about 0.4 $cm^3/g$ to about 0.8 $cm^3/g$, based upon the weight of the support. At least about 95% of the pores in the substrate have a diameter in the range of about 20 Å to about 500 Å. The catalytic support has a surface area of about 130 $m^2/g$ of catalyst to about 300 $m^2/g$ of catalyst. The catalyst also has a catalytically active phase of the catalyst is constituted by three metals. One metal is selected from Group VI-B of the Periodic Table. The other two metals are selected from Group VIII of the Periodic Table, one each from the first transition series of Group VIII and from the second transition series of Group VIII.

The Group VI-B element preferably is either tungsten (W) or molybdenum (Mo). The preferred Group VIII elements from the first transition series are nickel (Ni) or cobalt (Co), and from the second transition series are ruthenium (Ru) or palladium (Pd). The Group VI-B element is present in an amount of about 6% to about 30% by weight expressed as the corresponding oxide, based on the total catalyst weight. The Group VIII first transition series element, e.g., nickel or cobalt, is present in an amount of about 2% to about 10%, expressed as the corresponding oxide, based on total catalyst weight. The Group VIII second transition series element is present in an amount that is in the range of about 0.1% to about 1% by weight, based on the total catalyst weight.

The present catalyst exhibits certain signal band strength ratios, as determined by x-ray photoelectron spectroscopy (XPS), that are represented generally by the formula (Metal)/(Metal+Aluminum). This is the ratio of the peak area of the particular metal to the peak area of that same metal and the peak area for aluminum (as alumina) in the catalytic support. These band strength ratios are in the range of about 4 to about 12 for the Group VI-B element, preferably tungsten or molybdenum; about 1 to about 9 for the Group VIII element of the first transition series, preferably nickel or cobalt; about 0.1 to about 3 for the Group VIII element of the second transition series, and about 1 to about 10 for titanium. The catalyst is particularly well-suited for hydrocracking cracked feedstocks which contain in excess of 80% by volume of 200°+ fractions.

The catalyst is prepared by first forming a catalyst support, impregnating this support with the catalytically active metals, and then drying the impregnated catalyst under certain controlled conditions. The catalytic support is made from a mixture of aqueous aluminum sulfate and titanyl salt solutions to which an aqueous sodium aluminate solution is added to precipitate a titanium and aluminum hydrogel. The precipitated hydrogel is washed and dried at a temperature of about 50° C. to about 150° C. for 1 to 8 hours. The dried support is then mulled, preferably with a mild organic acid, such as acetic acid, and water, into a paste which is extruded into pellets. The extruded pellets contain about 5% to about 30%, preferably about 6% to about 15%, titania (titanium oxide) by weight, based on the weight of the support. The extruded pellets, i.e., the catalyst support, are then dried and calcined.

The dried support is first impregnated with a solution of a Group VI-B metal salt, preferably a tungsten or molybdenum salt. The metal concentration in the solution is sufficient to provide a concentration of about 6 percent to about 30 percent by weight of this metal (expressed as weight of the corresponding oxide), based on the weight of the catalyst. The impregnated support is dried at a temperature in the range of about 30° C. to about 150° C., preferably in the 60° to 120° C. range, and then first calcined at a temperature of about 300° C. to about 400° C. for two hours followed by calcination at a temperature of about 450° C. to about 550° C. for about 3 hours.

The impregnated support is then further impregnated with a solution of an element from the first transition series of Group VIII, i.e., cobalt, nickel, or iron, preferably cobalt or nickel, and an element from the second transition series of Group VIII, i.e., rhodium, ruthenium or palladium, preferably ruthenium or palladium. Preferably, the latter two impregnations are made concurrently. The concentrations of the metals in solution are sufficient to provide concentrations of about 2% to about 10% by weight of the first transition series Group VIII element and 0.1 to about 1% by weight of the second transition series Group VIII element, all based on the weight of the catalyst. The further impregnated catalyst is then dried as before, i.e., at a temperature in the range of about 30° C. to about 150° C., preferably in the 60° to 120° C. range, and calcined at a temperature of about 300° C. to about 400° C. for two hours, and thereafter calcined further at a temperature of about 450° C. to about 550° C. for about 3 hours.

The catalyst embodying the present invention is used to mildly hydrocrack cracked petroleum hydrocarbon feedstock by contacting the catalyst with the cracked feedstock under hydrocracking conditions, typically including a temperature range of about 350° C. to about 400° C., a pressure in the range of about 600 to about 2,000 psig, a liquid hourly space velocity in the range of about 0.1 h$^{-1}$ to about 5 h$^{-1}$, and a hydrogen-to-hydrocarbon feedstock ratio in the range of about 200 Nm$^3$/m$^3$ to about 900 Nm$^3$/m$^3$.

DETAILED DESCRIPTION OF THE PREFERRED EMBODIMENT

Figure 1:
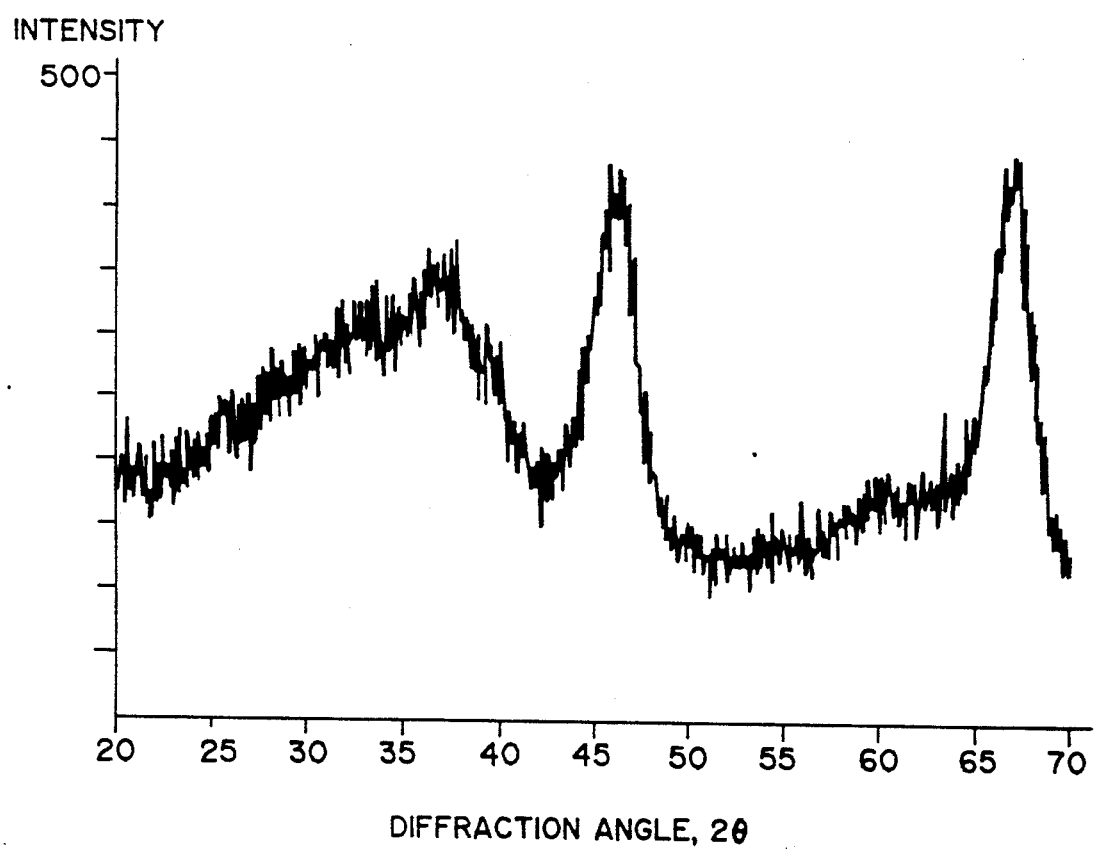
FIG. 1 is a graph which illustrates the X-ray diffraction pattern of the alumina-titania catalyst support disclosed herein.

The present invention is directed to an improved catalyst that utilizes a unique support and three catalytically active elements on that support. The support is made of alumina and titania, and is manufactured by co-precipitation as a hydrogel of an aqueous titanyl (TiO$^{2+}$) salt solution combined with an aluminum sulfate solution. Co-precipitation is effected by the addition of a sodium aluminate solution. Illustrative of such titanyl salt solutions are the titanyl halide, e.g., titanyl chloride (TiOCl$_2$), and titanyl sulfate (TiOSO$_4$) solutions. Preferably, a Group VI-B transition element of the second or third transition series, namely molybdenum (Mo) or tungsten (W) is present together with a Group VIII transition element of the first transition series, namely cobalt (Co), nickel (Ni) or iron (Fe), and a Group VIII transition element of the second transition series, namely ruthenium (Ru), rhodium (Rh) or palladium (Pd), as the three catalytically active elements on the porous alumina and titania support.

It has been found that by utilizing a titanyl (TiO$^{2+}$) salt to prepare the catalytic support, sulfates can be more readily removed during washing of the produced hydrogel. In addition, the use of a titanyl salt permits more efficient extrusion of the catalyst support and provides enhanced texture as well as enhanced surface acidity for the catalyst support. Suitable titanyl salt solutions can be readily obtained upon hydrolysis of titanium tetrachloride or titanium trichloride.

The amount of titania in the produced catalyst support is about 5% to about 30% by weight, preferably about 6% to about 15% by weight, of the catalyst support. By preparing the support in this manner, the titanium and the aluminum ions are more intimately intermixed throughout the support which facilitates substitution of the metals for each other in the support matrix. This, in turn, makes the support more acidic. An optimum support surface acidity is achieved when the molar ratio of titanium to aluminum in the support is about 1:9.

The precipitated alumina and titania hydrogels are spray dried, and the resulting dried powders are then blended in the presence of an aqueous organic acid such as acetic acid. If desired, an aqueous inorganic acid, such as nitric acid, can also be used. An aqueous acid solution that has an acetic acid concentration of about 0.35 M to about 0.5 M (about 2% to about 3% acetic acid by volume) is preferred. The powder and solution are blended into a paste and extruded. The extruded paste is dried at a temperature of about 30° C. to about 80° C., preferably about 60° C., for about 2 hours and at a temperature of 60° C. to about 150° C., preferably about 120° C., for 3 hours. The dried support is then calcined at a temperature of about 300° C. to about 400° C., preferably about 350° C., for 2 hours, and at a temperature of 450° C. to about 600° C., preferably about 550° C., for about 3 hours.

The prepared catalyst support has a surface area in the range of about 130 m²/g to about 300 m²/g, preferably about 140 m²/g to about 250 m²/g. The pore volume of this catalyst support is in the range of about 0.4 cm³/g to about 0.8 cm³/g, preferably about 0.45 cm³/g to about 0.65 cm³/g. The pore size range in the catalyst support is about 20 Å to about 500 Å in diameter. At least about 95% of the total pore volume falls within this range.

The surface area and distribution of the pores in a representative catalytic support of the present invention was determined using the nitrogen Brunauer-Emmett-Teller (B-E-T) method described in Brunauer et al., J. Am. Chem. Soc., 60:309 (1938). The results are provided in Table I below:

TABLE I

| Pore Diameter Distribution in the Catalytic Support of Example 1, Below | |
|---|---|
| Average Pore Diameter | % Distribution |
| <30 | 5 |
| 30 to <60 | 27.1 |
| 60 to <90 | 28.4 |
| 90 to <150 | 25 |
| 150 to <300 | 6 |
| 300 to 600 | 6 |
| >600 | 2.5 |

The extruded catalyst support spheres or pellets are preferably about 0.25 cm to about 0.08 cm in diameter. The extruded particles are approximately 2.5 to about 5 mm long. The structural strength (bed strength) of the catalyst is about 7 kg/cm² to about 20 kg/cm².

The three metal moieties that constitute the catalytically active phase are loaded onto the catalyst support in a two step procedure. Initially, a Group VI-B element is impregnated onto the support. The Group VI-B element is preferably impregnated onto the support in the form of a metal salt solution, preferably a tungsten or molybdenum salt, with a metal concentration sufficient to provide a concentration of about 6% to about 30%, preferably about 12% to about 30% of the VI-B metal (expressed as weight of the corresponding metal oxide) by weight of the catalyst. In a preferred embodiment, the impregnating solution is buffered at a pH of about 4 to about 6. The impregnated catalyst is dried at a temperature of about 30° C. to about 150° C., preferably in two steps, 60° C. for 2 hours and 120° C. for 3 hours, and calcined first at a temperature of about 300° C. to 400° C. for about 2 hours and then at about 450° C. to about 550° C. for about 3 hours. The impregnated support is then further co-impregnated with a solution of a Group VIII (first transition series) element, i.e. cobalt, nickel or iron, preferably cobalt or nickel, and a Group VIII second transition series element, i.e., ruthenium (Ru), rhodium (Rh) or palladium (Pd), preferably Ru or Pd. Preferably about 2% to about 10% by weight of the Group VIII element (first transition series), expressed as the weight of the corresponding oxide and based on the weight of the catalyst, is loaded onto the support. The Group VIII second transition series element is loaded onto the support in an amount of about 0.1% to about 1% by weight based on total catalyst weight. The impregnating solution is preferably buffered at a pH of about 4 to about 6. In a preferred impregnating solution the NiO concentration is about 40 to about 160 g/l and the Ru concentration is about 1 to about 12 g/l. The further impregnated catalyst is dried at a temperature of about 30° C., to about 150° C., preferably 60°-120° C., for about 3 hours, and calcined at a temperature of about 300° C. to about 400° C. for about 2 hours and at about 450° C. to about 500° C. for about 3 hours.

This particular combination of preferred metals loaded onto the titania/alumina support described herein provides a metal dispersion on the catalyst support that enhances the hydrogenating function of the catalyst. This particular combination of metals also enhances the activity of the Group VIII (first transition series)/Group VI-B system, which saturates carbon-to-carbon double bonds in the feedstock aromatics and provides resistance to catalyst deactivation by the build-up of coke deposits. The Group VIII (first transition series)/Group VI-B system offers enhanced hydrogenation capacity due to the presence of the Group VIII second transition series element.

By utilizing the aforesaid double impregnating process, the use of additives to prevent metal precipitation in the impregnated solutions is not required. Furthermore, the double impregnation permits better penetration of the Group VI-B elements into the porous catalyst support.

The catalyst of the present invention offers improved dispersion of the catalytically active elemental moieties impregnated onto the support. The properties of the catalyst are directly related to the dispersion of the active elements on the surface of the support.

The dispersion of the elements on the catalyst support can be measured by X-ray photo-electron spectroscopy (XPS). The signals emitted during XPS enable the quantity of elements on the catalyst surface to be determined and calculated.

The XPS technique consists of exciting the atoms of the material by means of X-rays and measuring the energy spectrum of the electrons emitted by photoemission. As the X-rays penetrate only a few angstroms of the catalytic support, the spectrum obtained is a measure of the quantity of the element present on the surface of the catalyst. The XPS measurements are made using a Leybold LHS-10 apparatus which consists of an X-ray source, an energy analyzer and a detector system. The apparatus is operated at an energy level of h=1253.6 eV supplied by a magnesium cathode (Mg K) drawing 300 watts at a step energy of 50 eV. Carbon (1 s, 285 eV) and aluminum (2 p, 74.8 eV) are taken as standards for calculating the bonding energies.

The surface dispersion of the metals is determined by measuring the total area for the XPS signal intensity peak corresponding to each of the metals loaded onto the catalyst. The signal band strength ratio for each element is calculated by dividing the area of the peak for the particular element by the combined area of the particular element and the area of the aluminum peak. For example, if the dispersion of cobalt on the support is to be determined, the area of the cobalt peak, represented by Co, is divided by the combined area of the cobalt peak and the aluminum peak, represented by Al, the general formula being: (Co)/(Co+Al).

The signal band strength ratios for the metals on the support in a preferred embodiment of this invention are about 4 to about 12 for the Group VI-B element on the catalyst; about 1 to about 9 for the Group VIII first transition series element loaded on the catalyst; about 0.1 to about 3 for the Group VIII second transition series element on the catalyst; and about 1 to about 10 for the titanium on the surface of the catalyst.

Prior to use, the oxide precursor catalyst is activated by reduction-sulfidation reactions which convert the acidic, supported metals into metallic sulfides which are the catalytically active species during the hydrotreatment. The sulfidation process takes place in an atmosphere of $H_2S/H_2$. The atmosphere contains about 1% to about 10% by weight sulfur. The sulfidation process takes place at atmospheric pressure and at a temperature of about 200° C. to about 450° C.

The sulfidation process, and thus the activation of the catalyst, may also occur in a two phase, gas-liquid mixture of $H_2$ and a vacuum gas oil or a light oil containing about 0.5% to about 5% by weight of sulfur from a sulfiding agent (spiking agent) such as, e.g. dimethylsulfide, dimethyl disulfide, carbon disulfide, and the like. This alternate sulfidation process is carried out at a pressure of about 200 psig to about 600 psig, and a temperature of about 230° C. to about 400° C., with stepwise temperature increases of about 15° C. to about 30° C. per hour. The volumetric space velocity of the gas-liquid mixture during sulfidation is about 1 to about $3h^{-1}$.

The following examples are offered as illustrations of the concepts described herein. Nothing in these Examples is to be construed as a limitation on the scope of the invention except within the limits of the claims appended hereto.

EXAMPLE 1: PREPARATION OF Ni-W-Ru/TiO$_2$-Al$_2$O$_3$ CATALYST

The catalyst that was prepared by the following procedure was a nickel-tungsten-ruthenium metal system catalyst deposited on a titania-alumina support, designated as Ni-W-Ru/TiO$_2$-Al$_2$O$_3$.

A solution was prepared by combining aluminum sulfate [Al$_2$(SO$_4$)$_3$; 1.5 kg; 260 g/l], and titanyl chloride [TiOCl$_2$; 5 liters; 120 g/l]. A solution of sodium aluminate (300 g/l) which contained 3 kg of the salt was added to the combined metal ion solution to impart a relatively constant pH value of about 7 to about 8 to the combined metal solution. A slurry resulted. The slurry was filtered, rinsed with water twice and then spray dried. The resulting powder was blended with an aqueous solution of acetic acid (2.5% by volume). Approximately 0.6 cc of the acetic acid solution was added per gram of powder and a substance with a pastey or dough-like consistency resulted. The substance was extruded into pellets with various geometrical configurations such as cylindrical, trilobal, tetralobal, and the like, the shapes being about 0.16 cm to about 0.12 cm in length. The extruded composition was dried (60° C. for 2 hours; 120° C. for 3 hours) and calcined (350° C. for 2 hours; 550° C. for 3 hours). The drying and calcination were done at ambient pressure and in the presence of air.

The calcined support pellets were impregnated in two consecutive steps. In the first step, the support pellets were immersed in a solution containing ammonium meta-tungstate (20% by weight as WO$_3$). The pellets were dried following the procedure described above and calcined (350° C. for 2 hours; 480° C. for 3 hours) at ambient pressure in the presence of air. Next, the dried, impregnated pellets were combined with a solution of nickel nitrate (6% by weight as NiO) and ruthenium oxide (0.6% by weight ruthenium oxide) thereby further impregnating the pellets with nickel and ruthenium. The impregnated pellets were then dried and calcined following the procedure described above.

The produced catalyst contained about 20 wt.-% WO$_3$, about 6 wt.-% NiO, and about 0.6 wt.-% RuO$_2$ on 66.4 wt.-% TiO$_2$+Al$_2$O$_3$.

Another catalyst was prepared in a similar manner using a palladium salt instead of a ruthenium salt. The produced catalyst contained about 20 wt.-% WO$_3$, about 6 wt.-% NiO, and about 0.5 wt.-% PdO$_2$ on 68.5 wt.-% TiO$_2$+Al$_2$O$_3$.

The above described catalyst was evaluated using a cracked petroleum hydrocarbon feedstock that had been previously hydrotreated. The feedstock was previously hydrotreated using catalyst with nickel and molybdenum, and cobalt and molybdenum on an alumina support. The previous hydrotreatment occurred at a temperature of about 360° C. to 380° C., a pressure of about 600 psig to about 1500 psig and a liquid hourly space velocity of about 0.5 to about 1 $h^{-1}$.

Prior to use, the produced catalyst was activated by sulfidation with carbon disulfide. In the sulfidation procedure the catalyst was first dried for about 2 hours at about 120° C. under a hydrogen gas flow at about 50 psig. Alternatively, an inert gas such as nitrogen can be utilized during drying.

Thereafter the drying temperature was gradually increased to about 180° C. at a rate of about 30° C. per hour while maintaining gas flow through the catalyst. Upon reaching a temperature of about 180° C. a light oil feedstock containing about 2 weight percent CS$_2$ and hydrogen were injected into the catalyst (H$_2$/hydrocarbon ratio of about 300 Nm$^3$/m$^3$; LHSV about $2h^{-1}$; pressure about 300 psig).

Next, the catalyst temperature was elevated to about 260° C. at the same rate, i.e., about 30° C. per hour. The catalyst was then held at 260° C. for about 5 hours after which time period the temperature was elevated further, at a rate of about 30° C. per hour to a final temperature of about 320° C. The catalyst was then held at 320° C. for about 3 hours while the feedstock flow was maintained through the catalyst at the aforesaid conditions.

In use, the present particulate catalyst is contacted with a cracked petroleum hydrocarbon feedstock, under hydrocracking conditions, for a time period sufficient to convert at least a portion of the cracked petroleum hydrocarbon feedstock into diesel oil. Typical such cracked feedstock contains about 55 to 65 volume percent aromatics, 0.1 to about 0.5 weight percent sulfur, and no more than about 600 parts per million, by weight, of nitrogen. In general, the process flow during hydrocracking includes the mixing of hydrogen gas with the feedstock, heating of the resulting mixture, and contacting with a cracking catalyst in a reactor, usually a fixed bed reactor, under a predetermined hydrogen partial pressure. Hydrocracking processes can be operated at a temperature in the range of about 200° C. to about 425° C. and at a pressure in the range of about 100 psig to about 2,000 psig.

The reactor in which the mild hydrocracking catalyst of the present invention can be used is operated at a temperature of about 350° C. to about 400° C., preferably about 360° C. to about 380° C., a total pressure of about 600 psig to about 2,000 psig, preferably about 750 psig to about 1500 psig, and a liquid hourly space velocity (LHSV) of about 0.1 h$^{-1}$ and 5.0 h$^{-1}$, preferably about 0.1 h$^{-1}$ to about 2 h$^{-1}$.

The hydrogen-to-hydrocarbon feedstock charge ratio for the mild hydrocracking process that is preferred for the process using the catalyst of the present is about 200 Nm$^3$/m$^3$ to about 900 Nm$^3$/m$^3$, more preferably about 400 Nm$^3$/m$^3$ to about 900 Nm$^3$/m$^3$ (Nm$^3$=m$^3$@STP). The above conditions provide an optimum environment for operation of the present catalyst.

EXAMPLE 2: PREPARATION OF A PRIOR ART Ni-Mo-P/TiO$_2$-Al$_2$O$_3$ CATALYST

A Ni-Mo-P/TiO$_2$-Al$_2$O$_3$ catalyst was prepared using the procedure generally described in European Patent No. 0 199 399. Alpha aluminate powder and titania powder were added to a countercurrent batch muller and premixed dry for 30 minutes. Water and acetic acid were added to the muller over a 2 minute period and the resulting mixture was mulled for 30 minutes. Another aliquot of water was added and mulling was continued for an additional 15 minutes. The material was extruded, dried (150° C. for 12 hours) and calcined (566° C. for 2 hours) to form the catalyst support.

A solution of ammonium molybdate was mixed with a solution of an ammonium salt of phosphoric acid at room temperature (ammonium salt=250 g/l; phosphoric acid=30 g/l). Nickel nitrate [Ni(NO$_3$)$_2$.6H$_2$O; 375 g/l] was added to the mixture and the solution was used to impregnate the catalyst support. The resulting catalyst had a chemical composition that was 12% by weight of molybdenum (as MoO$_3$), 5% by weight of nickel (as NiO), 1.5% by weight phosphorous (as P$_2$O$_5$) and 6% by weight of titania based on the weight of the support. The amount of metal deposited on the support was determined by atomic absorption for Mo, Ni and Ti, and emission by induced current (plasma) for P. Dispersion of metals was determined by XPS technique. The impregnated carrier was dried and calcined. The catalyst was activated by contacting it with an H$_2$/H$_2$S stream (200° C. for 1 hour; 260° C. for 1 hour; and 370° C. for 2 hours) All weights were based on the weight of the finished catalyst.

EXAMPLE 3: A PRIOR ART Ni-Mo-P/Al$_2$O$_3$ CATALYST

A Ni-Mo-P/Al$_2$O$_3$ catalyst was made according to the procedure generally described in U.S. Pat. No. 4,600,703. A γ-alumina was co-impregnated with a solution of nickel nitrate (5.0% by weight NiO), ammonium hepta-molybdate (15.5% by weight MoO$_3$) and phosphoric acid (7.5% by wt P$_2$O$_5$) to provide the amounts stated on the support. The amount of metal deposited on the surface of the catalytic support was determined by the atomic absorption method for Mo and Ni, and emission by induced current (plasma) for P. The impregnated catalyst was dried and calcined in a kiln in a conventional manner. The catalyst was activated by sulfidation as described in Example 1 above.

EXAMPLE 4: A PRIOR ART Ni-W/Al$_2$O$_3$ CATALYST

A Ni-W/Al$_2$O$_3$ catalyst was prepared using a two-step impregnation of a conventional alumina catalytic support. A solution of ammonium metatungstate was combined with the alumina support. After the tungsten-impregnated catalyst was dried and calcined, it was combined with a solution of nickel nitrate. The tungsten solution contained tungsten (305 g/l; as WO$_3$). The nickel impregnating solution contained nickel nitrate (335 g/l). The metal loadings on the catalyst support were about 20% by weight of tungsten (as WO$_3$) and 5% by weight of nickel (as NiO) based on the weight of the final catalyst.

EXAMPLE 5: COMPARISON OF CHARACTERISTICS OF INVENTION CATALYST SUPPORT WITH PRIOR ART CATALYST SUPPORT

The physical properties of the catalyst support of the present invention (Example 1) and the catalyst supports of the prior art (Examples 2, 3 and 4) were compared. The bulk crushing strength of the catalyst supports was determined using an Erweka crusher. The crushing force was applied to the axial direction of the extruded pellets. The force required to break the extruded material of a certain size was measured. The crushing strength of 30 to 40 samples of each support was measured and the average value reported in Table II, below.

For all supports, the specific surface area and the pore volume are in the range of 150–200 m$^2$/g and 0.4–0.6 cm$^3$/g, respectively. However, the support of Example 1 demonstrated improved mechanical crush strength of the extrudates over those of the prior art.

TABLE II

| | Physical Properties of Catalyst Supports | | | |
|---|---|---|---|---|
| Example | 1 | 2 | 3 | 4 |
| Surface Area (B-E-T) (m$^2$/g) | 220 | 168 | 175 | 200 |
| Pore Volume (cc/g) | 0.45 | 0.53 | 0.44 | 0.54 |
| Bulk Crushing Strength (kg-f/cm$^2$) | 9.4 | 5.0 | 8.0 | 6.8 |

The mild hydrocracking catalyst of the present invention exhibits improved surface acidity even at high temperature. The resulting catalyst is more selective. Thus, those fractions of the hydrocracked feedstock that hydrocrack at temperatures in excess of 370° C. are preferentially converted into diesel oil.

Table III compares the acidity of the catalyst support of Examples 1 and 2 above and untreated alumina powder. The acidity of these materials was measured by absorption-desorption of pyridine at selected temperatures within a temperature range of about 30° C. to about 400° C. Table III clearly indicates that the support of the present invention (Example 1) has a greater acidity and, thus, a greater number of acid sites. Thus, applicant's catalyst clearly is more selective for the mild hydrocracking of cracked feedstocks into diesel fuel.

TABLE III

| | Acidity of the Catalyst Support at Various Temperatures | | | | |
|---|---|---|---|---|---|
| | Support Acidity (mol pyridine/g) × 10$^{-3}$ | | | | |
| Example | 30° C. | 100° C. | 200° C. | 300° C. | 400° C. |
| 1 | 3.8 | 0.41 | 0.23 | 0.10 | 0.08 |
| 2 | 2.4 | 0.26 | 0.15 | 0.09 | 0.03 |

TABLE III-continued

| | Acidity of the Catalyst Support at Various Temperatures | | | | |
|---|---|---|---|---|---|
| | Support Acidity (mol pyridine/g) × $10^{-3}$ | | | | |
| Example | 30° C. | 100° C. | 200° C. | 300° C. | 400° C. |
| Alumina | 2.2 | 0.30 | 0.16 | 0.03 | 0.00 |

The catalyst of the present invention has been evaluated to determine the acidity of the support as compared to catalyst supports of the prior art. Table IV below illustrates that the catalyst of the present invention also has a greater number of acid sites than the prior art catalysts of Examples 2 and 3. Again, the acidity of the catalyst was measured by absorption-desorption of pyridine in the catalyst at selected temperatures within the range of 30° C. to 400° C.

TABLE IV

| | Acidity of the Catalyst at Various Temperatures | | | | |
|---|---|---|---|---|---|
| | Catalyst Acidity (mol pyridine/g) × $10^{-3}$ | | | | |
| Example | 30° C. | 100° C. | 200° C. | 300° C. | 400° C. |
| 1 | 2.3 | 0.54 | 0.36 | 0.22 | 0.13 |
| 2 | 1.5 | 0.38 | 0.11 | 0.02 | 0.00 |
| 3 | 1.7 | 0.46 | 0.23 | 0.05 | 0.00 |

Figure 2:
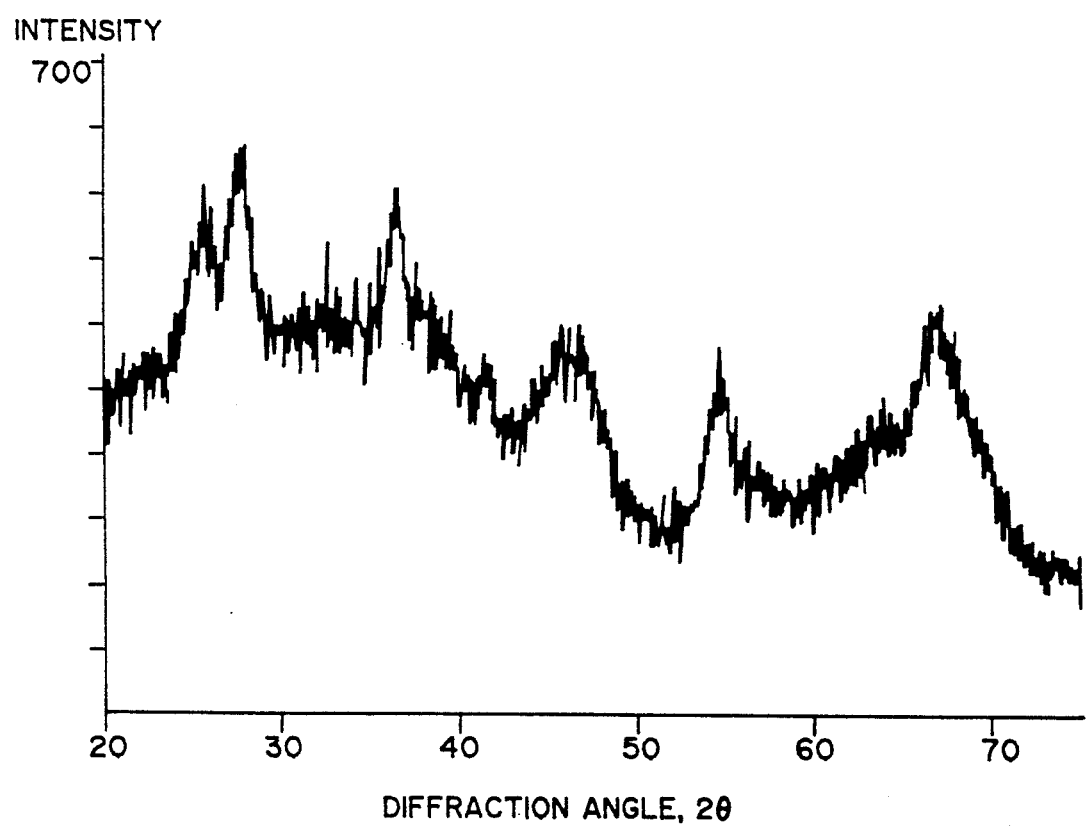
FIG. 2 is a graph which illustrates the X-ray diffraction pattern of the prior art alumina-titania catalyst support.

The catalyst of the present invention also has increased contact between the alumina and titania in the support. As stated previously, the intimate association of alumina and titania in the support improves the acidity of the catalyst. FIGS. 1 and 2 are the X-ray diffraction spectra of the alumina-titania supports of Examples 1 and 2, respectively. The X-ray diffraction spectra illustrates the crystalline structure of the catalyst support by plotting the diffraction angle, 2θ, against diffraction line intensity. In FIGS. 1 and 2 the zero point of intensity was fixed by computer based on the intensity of the principal peak. The intensity scale (in arbritrary units) was then divided into equal parts. The peaks correspond to the most common distances between the crystal planes in the structure. The more defined peaks of FIG. 1 illustrate that particular distances between crystal planes are more common in the catalyst support of the present invention. FIG. 2, with less defined peaks, obviously has a more amorphous or random structure. FIGS. 1 and 2 also illustrate that smaller titania crystallites are formed during the preparation of the catalyst support of the present invention. The formation of the smaller titania crystallites permits a wider distribution of the crystallites.

Table V, below, compares the titanium binding energy in the catalyst supports of Examples 1 and 2. The differences in the titania binding energy, about 0.6 eV for each orbital measured, indicate that the supports in the examples possess different structures, at least with regard to the titania in the support. The binding energies were determined by XPS.

TABLE V

| Binding Energy of Titanium Electrons in the ($2p_{3/2}$) and ($2p_{\frac{1}{2}}$) Orbitals* | | |
|---|---|---|
| | Binding Energy (eV) | |
| Catalyst Example | $2p_{3/2}$ | $2p_{\frac{1}{2}}$ |
| 1 | 457.7 | 463.3 |
| 2 | 458.3 | 463.8 |

*Measured by XPS

EXAMPLE 6: COMPARISON OF CHARACTERISTICS OF LOADED CATALYST OF THE PRESENT INVENTION WITH PRIOR ART CATALYST

The metal dispersion on the surface of the catalysts from Examples 1-4 are reported in Table VI below. The dispersion was measured by XPS. Table VI demonstrates that the surface dispersion of titanium on the catalyst of the present invention exceeds that found in the prior art catalyst of Example 2, which had a similar catalytic support composition. The titanium dispersion was three times greater in the catalyst of the present invention than in the prior art catalyst of Example 2, though actual titanium loadings on the two catalysts were comparable.

TABLE VI

| | Surface Composition of Catalyst | | | |
|---|---|---|---|---|
| | % Dispersion (Me/Me + Al)* | | | |
| Metal (Me) | Example 1 | Example 2 | Example 3 | Example 4 |
| Ni | 4.5 | 2.6 | 3.0 | 3.9 |
| Mo | — | 7.8 | 6.5 | — |
| W | 8.0 | — | — | 3.3 |
| Ti | 3.7 | 1.1 | — | — |
| P | — | 3.7 | 6.9 | — |
| Ru | 1.0 | — | — | — |

*Measured by XPS

The catalyst of the present invention exhibits stability over a long period of time and exhibits excellent activity for hydrodesulfurization, hydrodenitrogenation and mild hydrocracking of previously hydrocracked petrochemical feedstocks.

Table VII, below, compares the catalytic activity of the catalysts in Examples 1-4 by using the catalysts to mildly hydrocrack a previously hydrocracked feedstock containing the following based on the total weight of the feedstock: sulfur (0.17% by weight); nitrogen (580 ppm, by weight); 370° C.+fraction (62 volume-%); and aromatics concentration (about 50 volume-%).

The activities reported in Table VI were measured using a standard activity test. The reaction for which the activities in Table VI were measured took place at a temperature of 400° C. and a pressure of 800 psig. The volume ratio of hydrogen gas ($H_2$) to hydrocarbon feed was about 600 $Nm^3/m^3$, and the liquid hourly space velocity (LHSV) was 1 $h^{-1}$.

TABLE VII

| Catalyst Activities of Catalysts from Examples 1-4 | | | |
|---|---|---|---|
| Example | HDS[1] % | HDN[2] % | MHC[3] % |
| 1 | 88 | 58 | 24 |
| 2 | 86 | 54 | 17 |
| 3 | 85 | 49 | 16 |
| 4 | 86 | 46 | 12 |

[1] Hydrodesulfurization activity
[2] Hydrodenitrogenation activity
[3] Mild hydrocracking activity The catalyst of the present invention not only demonstrates an improved hydrodesulfurization and hydrodenitrogenation activity over prior art catalysts, but also has a markedly superior mild hydrocracking activity than the prior art catalyst.

EXAMPLE 7: EFFECT OF RUTHENIUM ON CATALYTIC ACTIVITY OF SUPPORTED NiW CATALYST

Supported catalysts having the respective compositions set forth in Table VIII, below, were used under typical mild hydrocracking conditions with previously hydrotreated cracked feedstock. The process conditions in both instances were as follows:

Reaction temperature: 380° C.
Total pressure: 800 psig
Space velocity (LHSV): 0.55 h$^{-1}$
H$_2$/Hydrocarbon ratio: 1000 Nm$^3$/m$^3$

TABLE VIII

| | Catalyst Composition | |
|---|---|---|
| | Catalyst of Invention | Supported NiW Catalyst |
| WO$_3$, wt. % | 20 | 20 |
| NiO, wt. % | 6 | 6 |
| RuO$_2$, wt. % | 0.6 | — |
| TiO$_2$ + Al$_2$O$_3$, wt. % | 73.4 | 74 |
| Properties of feedstock: | | |
| Degrees A.P.I.: 26.0 | | |
| Sulfur, wt. %: 0.394 | | |
| Nitrogen, ppm: 460 | | |
| 370° C. + fraction, vol. %: 42 | | |

Results from the foregoing treatment are compiled in Table IX, below.

TABLE IX

| | Processing Results | | |
|---|---|---|---|
| | HDS$^1$ % | MHC$^3$ % | AS$^4$ % |
| Catalyst of Invention | 93.4 | 23.8 | 22.6 |
| Supported NiW Catalyst | 84.7 | 20.0 | 13.0 |

$^1$Hydrodesulfurization activity
$^3$Mild hydrocracking activity
$^4$Aromatic saturation activity The foregoing data demonstrate the positive effect of ruthenium on hydrodesulfurization, mild hydrocracking, as well as aromatic saturation activities.

The foregoing discussion and examples are intended as illustrations only of the concepts of the invention disclosed herein and are not intended to limit the invention except as defined by the claims appended hereto.

We claim:

1. A catalyst for mild hydrocracking of cracked petroleum feedstocks comprising:
   a porous support comprising alumina and titania; wherein the alumina is present in an amount in the range of about 95 to about 70 weight percent, and wherein the titania is present in an amount of about 5 to about 30 weight percent, both based on the weight of the support; and
   a catalytically active tri-elemental phase on the support consisting essentially of a transition element of Group VI-B of the Periodic Table of Elements, a transition element of the first transition series of Group VIII of the Periodic Table of Elements, and a transition element of the second transition series of Group VIII of the Periodic Table of Elements;
   said porous support having a surface area in the range of about 130 m$^2$/gram to about 300 m$^2$/gram and at least about 95 percent of the pores thereof having a pore diameter in the range of about 20 Angstroms to about 500 Angstroms; and
   said Group VI-B transition element being present in an amount in the range of about 6 weight percent to about 30 weight percent, expressed as weight of the corresponding oxide and based on the weight of the catalyst, said Group VIII first transition series element being present in an amount in the range of about 2 weight percent to about 10 weight percent, expressed as weight of the corresponding oxide and based on the weight of the catalyst, and said Group VIII second transition series element being present in an amount in the range of about 0.1 weight percent to about 1 weight percent, based on the weight of the catalyst.

2. The catalyst according to claim 1 wherein said Group VI-B element is tungsten.

3. The catalyst according to claim 1 wherein said Group VI-B element is molybdenum.

4. The catalyst according to claim 1 wherein said transition element of the first transition series of Group VIII is cobalt.

5. The catalyst according to claim 1 wherein said transition element of the first transition series of Group VIII is nickel.

6. The catalyst according to claim 1 wherein said transition element of the second transition series of Group VIII is ruthenium.

7. The catalyst according to claim 1 wherein said transition element of the second transition series of Group VIII is palladium.

8. The catalyst according to claim 1 wherein said catalytically active tri-elemental phase consists essentially of tungsten, nickel, and ruthenium.

9. The catalyst according to claim 1 wherein said catalytically active tri-elemental phase consists essentially of tungsten, nickel and palladium.

10. The catalyst according to claim 1 wherein said porous support comprises about 94 to about 85 weight percent alumina and about 6 to about 15 weight percent titania.

11. The catalyst according to claim 1 wherein the catalyst exhibits an x-ray photoelectron spectroscopy signal band strength ratio for said Group VI-B element-to-(same Group VI-B element-plus-aluminum) in the range of about 4 to about 12, for said Group VIII element of the first transition series-to-(same Group VIII element-plus-aluminum) in the range of about 1 to about 9, for titanium-to-(titanium-plus-aluminum) in the range of about 1 to about 10, and for said Group VIII element of the second transition series-to-(same Group VIII element-plus-aluminum) in the range of about 0.1 to about 3.

12. The catalyst according claim 1 wherein said catalytically active tri-elemental phase consists essentially of tungsten (W), nickel (Ni) and ruthenium (Ru) and wherein the catalyst exhibits x-ray photoelectron spectroscopy signal band strength ratios as follows:
   W/W+Al about 4 to about 12;
   Ni/Ni+Al about 1 to about 9;
   Ti/Ti+Al about 1 to about 10; and
   Ru/Ru+Al about 0.1 to about 3.

13. The catalyst according to claim 1 wherein said catalytically active tri-elemental phase consists essentially of tungsten (W), nickel (Ni) and ruthenium (Ru), and wherein the catalyst exhibits x-ray photoelectron spectroscopy signal band strength ratios as follows:
   W/W+Al about 8;
   Ni/Ni+Al about 4.5;
   Ti/Ti+Al about 3.7; and
   Ru/Ru+Al about 1.

14. The catalyst according to claim 1 wherein said catalyst contains about 20 weight percent $WO_3$, about 6 weight percent NiO, and about 0.6 weight percent ruthenium oxide, and said alumina and titania support constitutes about 66.4 weight percent of the catalyst.

15. The catalyst according to claim 1 wherein said catalyst contains about 20 weight percent $WO_3$, about 6 weight percent NiO, and about 0.5 weight percent palladium oxide, and said alumina and titania support constitutes about 68.5 weight percent of the catalyst.

16. The catalyst of claim 1 wherein the support has a pore volume in the range of about 0.4 to about 0.8 $cm^3$/gram.

17. The catalyst of claim 16 wherein the pore volume is in the range of about 0.45 $cm^3$/gram to about 0.65 $cm^3$/gram.

18. A method for making a catalyst suitable for the mild hydrocracking of cracked feedstocks with significant amounts of sulfur, nitrogen, and aromatic components, which method comprises:
   providing an alumina-titania support structure which contains about 95 to about 70 weight percent alumina and about 5 to about 30 weight percent titania, based on the weight of the support structure; the support structure having a pore volume in the range of about 0.4 to about 0.8 $cm^3$/gram, a surface area in the range of about 130 to about 300 $m^2$/gram, and having at least about 95 percent of the pores of a diameter in the range of about 20 Angstroms to about 500 Angstroms;
   impregnating the alumina-titania support with a first component selected from Group VI-B of the Periodic Table, the impregnation taking place in an aqueous solution, buffered at a pH value in the range of about 4 to about 6, of a salt of the first metallic component so as to obtain a catalyst composition that is about 6% to about 30% by weight of the first component expressed as the weight of the corresponding oxide of the component;
   drying the impregnated support;
   calcining the impregnated support;
   further impregnating the dried, impregnated support with a second elemental component selected from the first transition series of Group VIII of the Periodic Table, so as to obtain a catalyst composition that is about 2 to about 10 by weight of the oxide of the second component based on the weight of the catalyst, and with a third elemental component selected from the second transition series of Group VIII of the Periodic Table so as to obtain a concentration of about 0.1% to about 1% by weight of the third component on the catalyst, based on the weight of the catalyst;
   drying the further impregnated support; and
   calcining the dried, further impregnated support.

19. The method of claim 18 wherein the drying steps are 2 hours at a temperature of about 60° C. and then 3 hours at a temperature of about 120° C.

20. The method of claim 18 wherein the calcination is carried out first at a temperature of about 300° C. to about 400° C. for about two hours and then at a temperature of about 450° C. to about 550° C. for about 3 hours.

21. The method of claim 18 wherein the produced catalyst is activated by sulfidation.

22. The method of claim 21 wherein said sulfidation is carried out with carbon disulfide.

23. A method of forming an alumina-titania support suitable for use as a catalyst support which comprises combining aqueous solutions of aluminum sulfate and a titanyl salt to form an admixture;
   co-precipitating titanium and aluminum hydrogels from the admixture by the addition of sodium aluminate;
   recovering the co-precipitated hydrogels;
   drying the recovered co-precipitated hydrogels; and
   calcining the dried support.

24. The method of claim 23 wherein the sodium aluminate solution is added in an amount sufficient to achieve a constant solution pH of about 7 to about 8 in the admixture.

25. The method of claim 23 further comprising blending the dried, co-precipitated hydrogels with an aqueous solution and forming a paste;
   extruding the paste; and
   drying the extruded paste.

26. The method of claim 25 wherein the aqueous solution comprises acetic acid or nitric acid.

27. The method of claim 26 wherein the aqueous solution is added in an amount of about 0.6 cc per gram of dried, co-precipitated hydrogels.

28. The method of claim 25 wherein the extruded paste is dried first at about 60° C. for about 2 hours and then at 120° C. for about 3 hours.

29. The method of claim 23 wherein the alumina-titania support is dried at a temperature of about 50° C. to about 150° C. for about 1 to about 8 hours and calcined at a temperature of about 300° C. to about 400° C. for about 2 hours and about 450° C. to about 550° C. for about 3 hours.

* * * * *